US011934125B2

(12) United States Patent
Ohta

(10) Patent No.: US 11,934,125 B2
(45) Date of Patent: Mar. 19, 2024

(54) IMAGE FORMING APPARATUS HAVING A WEB TO COLLECT TONER FROM A HEATING ROTARY MEMBER

(71) Applicant: CANON KABUSHIKI KAISHA, Tokyo (JP)

(72) Inventor: Hideki Ohta, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/897,087

(22) Filed: Aug. 26, 2022

(65) Prior Publication Data

US 2023/0068327 A1 Mar. 2, 2023

(30) Foreign Application Priority Data

Aug. 31, 2021 (JP) ................................ 2021-141377

(51) Int. Cl.
*G03G 15/20* (2006.01)
*G03G 15/00* (2006.01)

(52) U.S. Cl.
CPC ..... *G03G 15/2053* (2013.01); *G03G 15/2064* (2013.01); *G03G 15/5008* (2013.01); *G03G 2215/2038* (2013.01)

(58) Field of Classification Search
CPC ................................................ G03G 15/2053
USPC ........................................................ 399/328
See application file for complete search history.

(56) References Cited

U.S. PATENT DOCUMENTS

| | | | |
|---|---|---|---|
| 5,323,217 | A | 6/1994 | Christy |
| 7,531,276 | B2 | 5/2009 | Ishiyama |
| 2014/0029991 | A1 | 1/2014 | Kubota |
| 2021/0223723 | A1 | 7/2021 | Chikugo |

FOREIGN PATENT DOCUMENTS

| | | | | | |
|---|---|---|---|---|---|
| CN | 104834200 | B | * 6/2017 | | ......... G03G 15/2025 |
| CN | 110308631 | A | * 10/2019 | | ......... G03G 15/2025 |
| JP | S58182673 | A | 10/1983 | | |
| JP | S58221876 | A | 12/1983 | | |
| JP | S6392983 | A | 4/1988 | | |
| JP | H4182686 | A | 6/1992 | | |
| JP | H10307503 | A | 11/1998 | | |
| JP | 2001-282029 | A | 10/2001 | | |

* cited by examiner

*Primary Examiner* — Quana Grainger
(74) *Attorney, Agent, or Firm* — Canon U.S.A., Inc. I.P. Division

(57) ABSTRACT

An image forming apparatus includes a heating rotary member that heats toner born on a recording material, and a pressure rotary member that pressurizes the heating rotary member. These rotary members form a fixing nip portion and fix a toner image to the recording material at the fixing nip portion while nipping and conveying the recording material. The apparatus further includes a web that collects toner adhering to a surface of the heating rotary member, a winding roller that winds the web, a motor that rotates the winding roller, a contact member that makes contact with an outer surface of the wound web and moves based on a position of the outer surface, a variable resistor that is connected to change a resistance value depending on a position of the contact member, and a control unit that controls a rotation amount of the motor based on the resistance value.

14 Claims, 10 Drawing Sheets

IMAGE FORMING APPARATUS HAVING A WEB TO COLLECT TONER FROM A HEATING ROTARY MEMBER

BACKGROUND OF THE INVENTION

Field of the Invention

The present invention relates to an image forming apparatus that forms a toner image on a recording material.

Description of the Related Art

An image forming apparatus includes a fixing device that fixes an unfixed toner image born on a recording material to the recording material.

The fixing device includes a rotation member pair including a heating rotary member and a pressure rotary member. The heating rotary member is rotationally driven to apply heat to the unfixed toner image. The pressure rotary member is rotationally driven to pressurize the heating rotary member to form a fixing nip portion with the heating rotary member. When a recording material with an unfixed toner image thereon is conveyed to the fixing nip portion, the recording material is heated by the heating rotary member and pressurized by the pressure rotary member, so that the unfixed toner image is fixed to the recording material.

There is a possibility of occurrence of hot offset in the fixing device. The hot offset is a phenomenon in which the unfixed toner adheres to the surface of the heating rotary member without being fixed to the recording material, due to the heat of the heating rotary member being excessively transferred to the unfixed toner. The toner (the hot offset toner) remaining on the surface of the heating rotary member due to the hot offset may adhere to the subsequent sheet and cause an image defect.

To address the issue, Japanese Patent Application Laid-open No. 2001-282029 discusses a configuration in which a web unit is provided in a fixing unit to eliminate the hot offset toner. A web made of an unwoven fabric or the like can remove the hot offset toner from the heating rotary member to clean the heating rotary member.

The web used to clean the surface of the heating rotary member is wound by rotation of a winding roller. As the amount of the wound web increases, the outer diameter of the wound web increases. For this reason, when the winding roller winds the web, the rotation amount of the winding roller is changed based on the outer diameter of the wound web.

A solenoid is used in the web unit of the fixing device discussed in Japanese Patent Application Laid-open No. 2001-282029. The solenoid has a function of changing the rotation amount of the winding roller based on the outer diameter of the wound web when the winding roller winds the web. The fixing device adopts a method in which the web unit using the solenoid controls the winding amount of the web based on the outer diameter of the wound web.

In the conventional web unit using the solenoid, a lever moved by the solenoid rotates the winding roller via a gear to wind the web. In a case where a desired amount of the web is wound using the solenoid, a large error may occur in the winding amount of the web due to the configuration.

In addition, the web is wound more by the amount corresponding to the occurring error in order to prevent the winding amount from becoming less than the desired amount for the cleaning if the error occurs. Thus, there is a possibility that the consumption of the web may increase with the conventional web unit.

SUMMARY OF THE INVENTION

The present invention is directed to an image forming apparatus capable of winding a web accurately.

According to an aspect of the present invention, an image forming apparatus includes a heating rotary member configured to heat toner born on a recording material, a pressure rotary member configured to pressurize the heating rotary member, wherein the heating rotary member and the pressure rotary member form a fixing nip portion and fix a toner image to the recording material at the fixing nip portion while nipping and conveying the recording material with the toner born thereon, a web configured to collect toner adhering to a surface of the heating rotary member without being fixed to the recording material, a winding roller configured to wind the web, a motor configured to rotate the winding roller to wind the web, a contact member configured to make contact with an outer surface of the web wound by the winding roller and move based on a position of the outer surface, a variable resistor configured to be connected so as to change a resistance value of the variable resistor depending on a position of the contact member, and a control unit configured to control a rotation amount of the motor based on the resistance value.

Further features of the present invention will become apparent from the following description of exemplary embodiments with reference to the attached drawings.

DESCRIPTION OF THE EMBODIMENTS

<Image Forming Apparatus>

Figure 1:
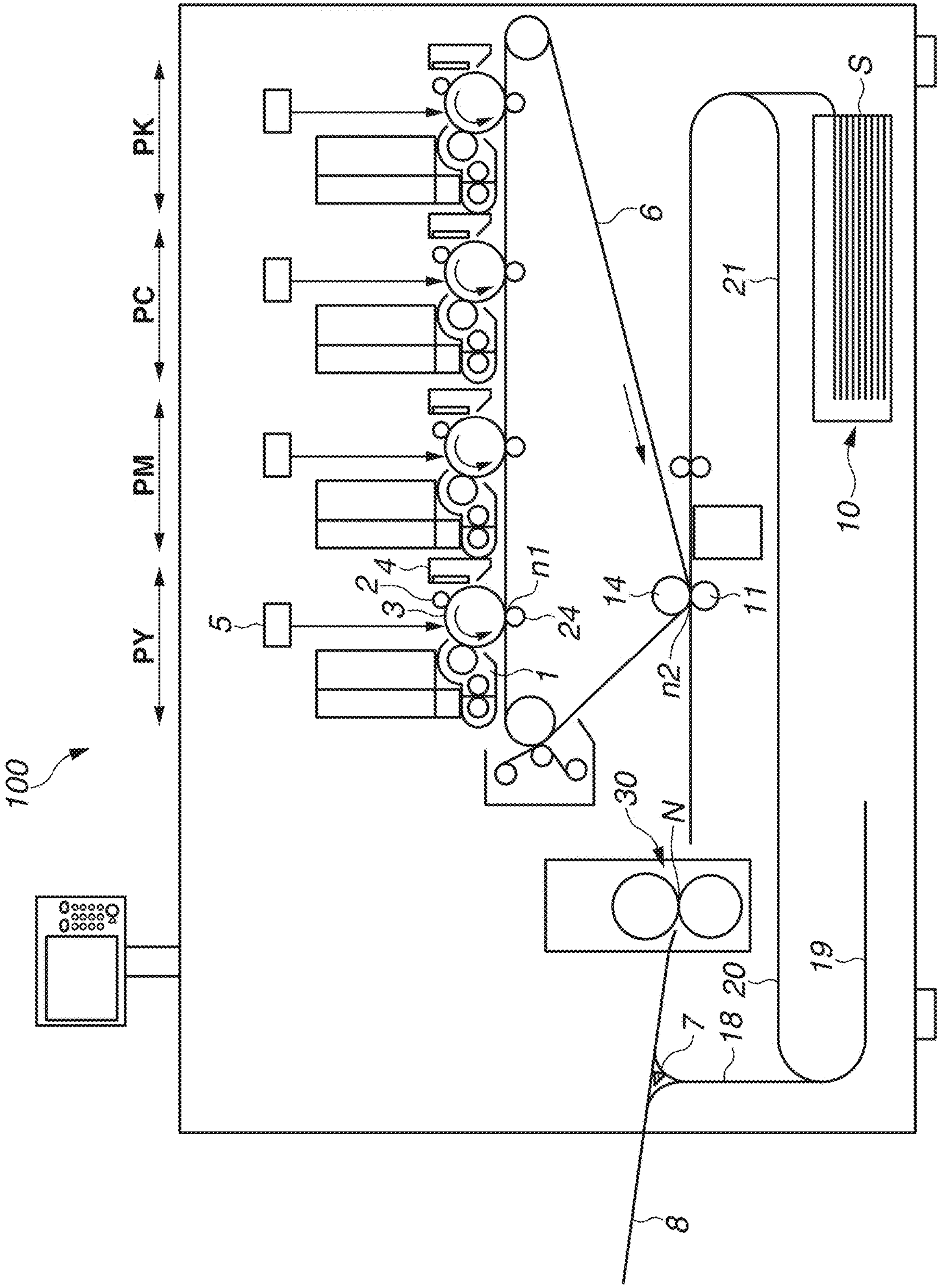
FIG. 1 is a schematic diagram illustrating a configuration of an image forming apparatus.

FIG. 1 schematically illustrates a configuration of an image forming apparatus 100 according to an exemplary embodiment of the present invention. As illustrated in FIG. 1, the image forming apparatus 100 includes four image forming units PY, PM, PC, and PK for yellow, magenta, cyan, and black, respectively. These image forming units are arranged along a moving direction (indicated by an arrow) of an intermediate transfer belt 6. First, processes for forming a toner image on the intermediate transfer belt 6 will be described using the image forming unit PY for yellow as an example.

A charging device 2 uniformly charges a surface of a photoconductive drum 3 rotationally being driven (in a charging process). Next, an exposure unit 5 emits a laser beam to the surface of the photoconductive drum 3 based on input image data to form an electrostatic latent image on the surface of the photoconductive drum 3 (in an exposure process). Then, a development unit 1 forms a yellow toner image on the photoconductive drum 3 (in a development process). A primary transfer roller 24 applies a voltage with a polarity opposite to that of the yellow toner image, to the intermediate transfer belt 6. Accordingly, the yellow toner image on the photoconductive drum 3 is transferred onto the intermediate transfer belt 6 at a primary transfer portion n1 (in a primary transfer process). The yellow toner remaining on the surface of the photoconductive drum 3 without being transferred to the intermediate transfer belt 6 is scraped off by a toner cleaner 4 and removed from the surface of the photoconductive drum 3. The series of processes are performed in a similar manner by the image forming unit PM for magenta, the image forming unit PC for cyan, and the image forming unit PK for black. As a result, a full color toner image is formed on the intermediate transfer belt 6.

The toner image on the intermediate transfer belt 6 is conveyed to a secondary transfer portion n2 formed by a pair of secondary transfer rollers 11 and 14. Sheets of a recording material S are picked up from a recording material cassette 10 one by one in synchronization with a conveyance timing of the toner image, and the recording material S is fed to the secondary transfer portion n2, so that the toner image on the intermediate transfer belt 6 is transferred onto the recording material S (in a secondary transfer process).

The recording material S with the toner image transferred thereon is conveyed to a fixing device 30. The fixing device 30 applies heat and pressure to the recording material S to fix the toner image to the recording material S (in a fixing process). The recording material S with the toner image fixed thereon is discharged to a discharge tray 8.

The image forming apparatus 100 can also form a monochrome image. In the case of forming a monochrome image, only the image forming unit PK for black is driven among the plurality of image forming units.

A description will be given of a duplex printing for forming images on both sides of the recording material S. The recording material S with an image formed on one side thereof is discharged from the fixing device 30 and then guided to a paper path 18 by a flapper 7. When the recording material S is conveyed to a reversing path 19 through the paper path 18, the recording material S is conveyed in a switch-back manner on the reversing path 19. Then, the recording material S passes through a duplex path 20 and is conveyed to a paper path 21. At this time, the recording material S is in a front-back reversed state. The recording material S is then conveyed again to the secondary transfer portion n2 to transfer a toner image onto the recording material S. The toner image is then fixed to the recording material S by the fixing device 30. The recording material S with the images on both sides thereof is discharged to the discharge tray 8.

The processes from the charging process to the discharge process for discharging the recording material S with the toner image fixed thereon to the discharge tray 8 are referred to as image forming processing (a print job). In addition, a period during which the image forming processing is performed is referred to as "during image forming processing (during a print job)".

<Fixing Device>

Figure 2:
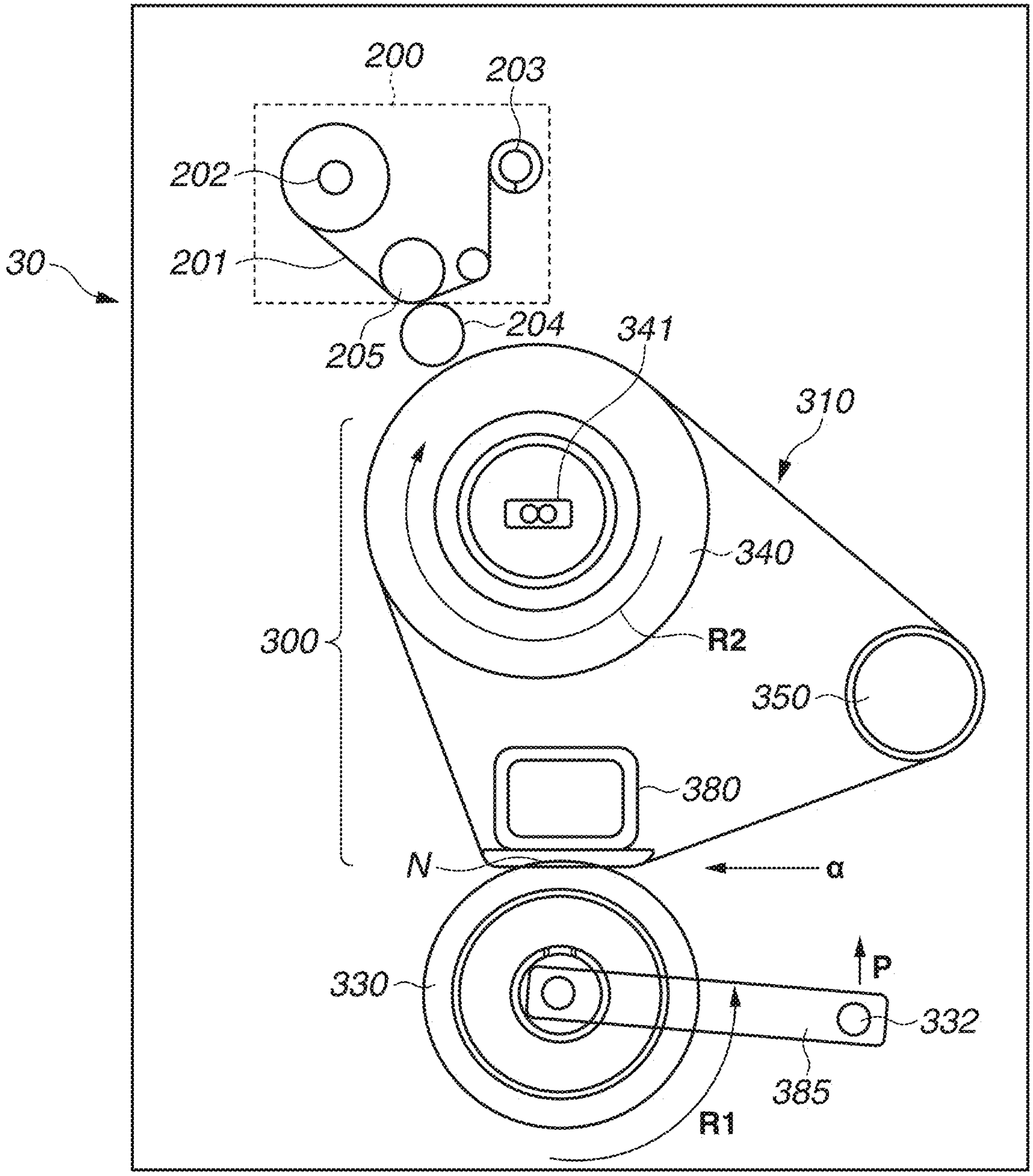
FIG. 2 is a schematic cross-sectional diagram illustrating a fixing device including a web unit.

Next, the fixing device 30 according to the present exemplary embodiment will be described with reference to FIG. 2.

In the present exemplary embodiment, the fixing device 30 using a rotatable endless fixing belt 310 is employed. Referring to FIG. 2, the recording material S is conveyed in a direction indicated by an arrow a. The fixing device 30 includes a heating rotary member 300 and a pressure rotary member 330. The heating rotary member 300 includes the fixing belt 310. The pressure rotary member 330 forms a fixing nip portion N with the fixing belt 310 by making contact with the fixing belt 310 to apply pressure to the fixing belt 310.

The heating rotary member 300 includes the fixing belt 310, a steering roller 350, a fixing pad (a pad member) 380, and a heating roller 340. The fixing pad 380 and the heating roller 340 are brought into contact with an inner circumferential surface of the fixing belt 310. The fixing belt 310 is stretched around the fixing pad 380 and the heating roller 340.

The heating roller 340 is formed of metal such as aluminum or stainless-steel and has an cylindrical shape. In the present exemplary embodiment, the heating roller 340 is formed of an aluminum pipe with an outer diameter of 80 mm A halogen heater 341 is disposed in the heating roller 340, as a heating unit for heating the fixing belt 310. The heating roller 340 is heated to a predetermined temperature by the halogen heater 341. The fixing belt 310 is heated by the heating roller 340 that is heated by the heat of the halogen heater 341. The fixing belt 310 is controlled to be at a predetermined target temperature corresponding to grammage of the recording material S (a fixing target) based on a temperature detection result of a fixing temperature detection sensor (not illustrated).

The heating unit is not limited to the halogen heater 341, and the heating roller 340 may be heated, for example, using an electromagnetic induced heating (IH) method. The heating roller 340 is rotationally driven in a direction indicated by an arrow R2 by receiving a driving force from a motor (not illustrated).

The fixing belt 310 is excellent in thermal conductivity and heat resistance and is, for example, a thin endless belt with an inner diameter of 120 mm. In the present exemplary embodiment, the fixing belt 310 has a three-layer structure including a base layer, an elastic layer on the outside of the base layer, and a release layer on the outside of the elastic layer. The base layer is 60 μm in thickness and made of polyimide (PI) resin, the elastic layer is 300 μm in thickness and made of silicone rubber, and the release layer is 30 μm in thickness and made of perfluoroalkoxy alkane (PFA), which is a copolymer of tetrafluoroethylene and perfluoroalkoxyethylene, as fluororesin. The fixing belt 310 is rotationally driven by the pressure rotary member 330 (described below) being rotationally driven while pressurizing the fixing pad 380 via the fixing belt 310. Since the heating roller 340 is rotationally driven by receiving the driving force from the motor (not illustrated), the fixing belt 310 is also rotationally driven by the rotational driving force of the heating roller 340.

The fixing pad 380 is arranged on the inner circumferential surface of the fixing belt 310 so as to face the pressure rotary member 330 across the fixing belt 310. In the present exemplary embodiment, the fixing belt 310 and the fixing pad 380 can smoothly slide with each other with a lubricant sheet containing silicone oil or a lubricant such as silicone oil interposed between the fixing belt 310 and the fixing pad 380. Thus, the oil such as the silicone oil is applied to the inner circumferential surface of the fixing belt 310.

The pressure rotary member 330 includes an aluminum cylindrical core metal, an elastic layer with a thickness of 1 mm on the outside of the core metal, and a release layer for improving separability from toner on the outside of the elastic layer.

The pressure rotary member 330 is rotationally driven in a direction indicated by an arrow R1. Accordingly, the fixing belt 310 sandwiched between the pressure rotary member 330 and the fixing pad 380 is rotationally driven by the rotational driving force of the pressure rotary member 330.

The pressure rotary member 330 can be moved by a contact/separation mechanism that moves the pressure rotary member 330 to make contact with or separate from the fixing belt 310. The contact/separation mechanism includes a frame 385 and a drive motor (not illustrated). The frame 385 is supported by the image forming apparatus 100. The frame 385 supports the pressure rotary member 330. The frame 385 is configured to rotate about a rotation shaft 332 serving as a rotation axis by receiving a driving force from the drive motor (not illustrated). When the frame 385 is rotated clockwise on the paper surface of FIG. 2 by the drive motor (not illustrated) with the rotation shaft 332 as the rotation axis, the pressure rotary member 330 is moved in a direction indicated by an arrow P. This brings the pressure rotary member 330 into contact with the fixing pad 380 across the fixing belt 310 in a vertical direction with respect to the conveyance direction a of the recording material S (which refers to a contact state). Accordingly, the fixing nip portion N is formed. In the present exemplary embodiment, the fixing nip portion N is formed with a total pressure force of 2000 N and a width of 24 mm. When the frame 385 is rotated counterclockwise on the paper surface of FIG. 2 with the rotation shaft 332 as the rotation axis, the pressure rotary member 330 becomes separated from the fixing belt 310 (which refers to a separation state).

As described above, the recording material S with the unfixed toner image born thereon is nipped and conveyed by the heating rotary member 300 and the pressure rotary member 330 at the fixing nip portion N to apply heat and pressure to the recording material S, so that the unfixed toner image is fixed to the recording material S.

Figure 10:
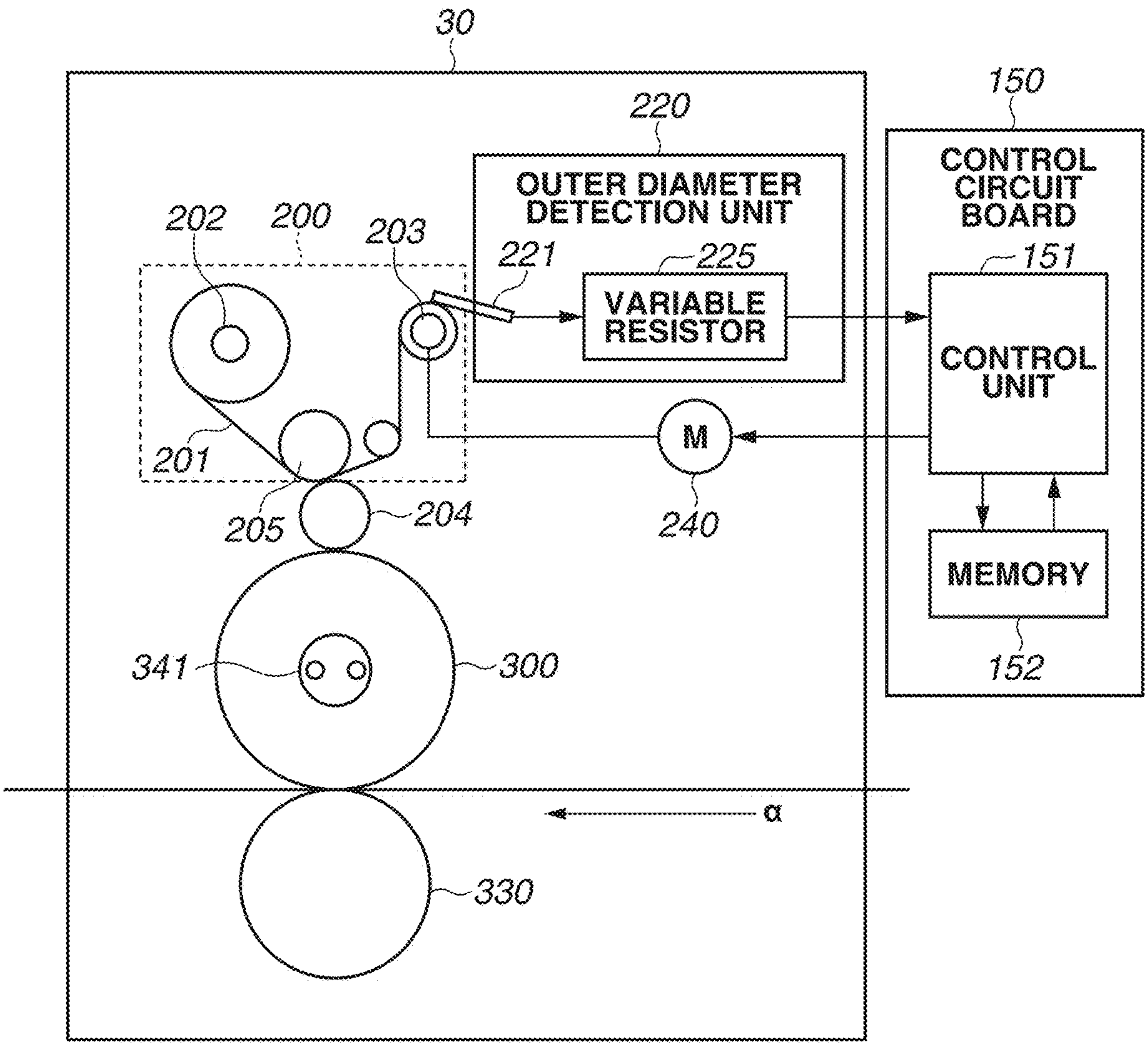
FIG. 10 is a schematic cross-sectional diagram illustrating a roller pair type fixing device including the web unit.

As described above, the image forming apparatus 100 according to the present exemplary embodiment has a configuration including the fixing device 30 using the endless fixing belt 310, i.e., a belt type fixing device. However, the configuration is not limited thereto. As illustrated in FIG. 10, the fixing device 30 may be configured to perform fixing processing on the recording material S using a roller pair of the heating rotary member 300 and the pressure rotary member 330.

<Web Unit>

Figure 3:
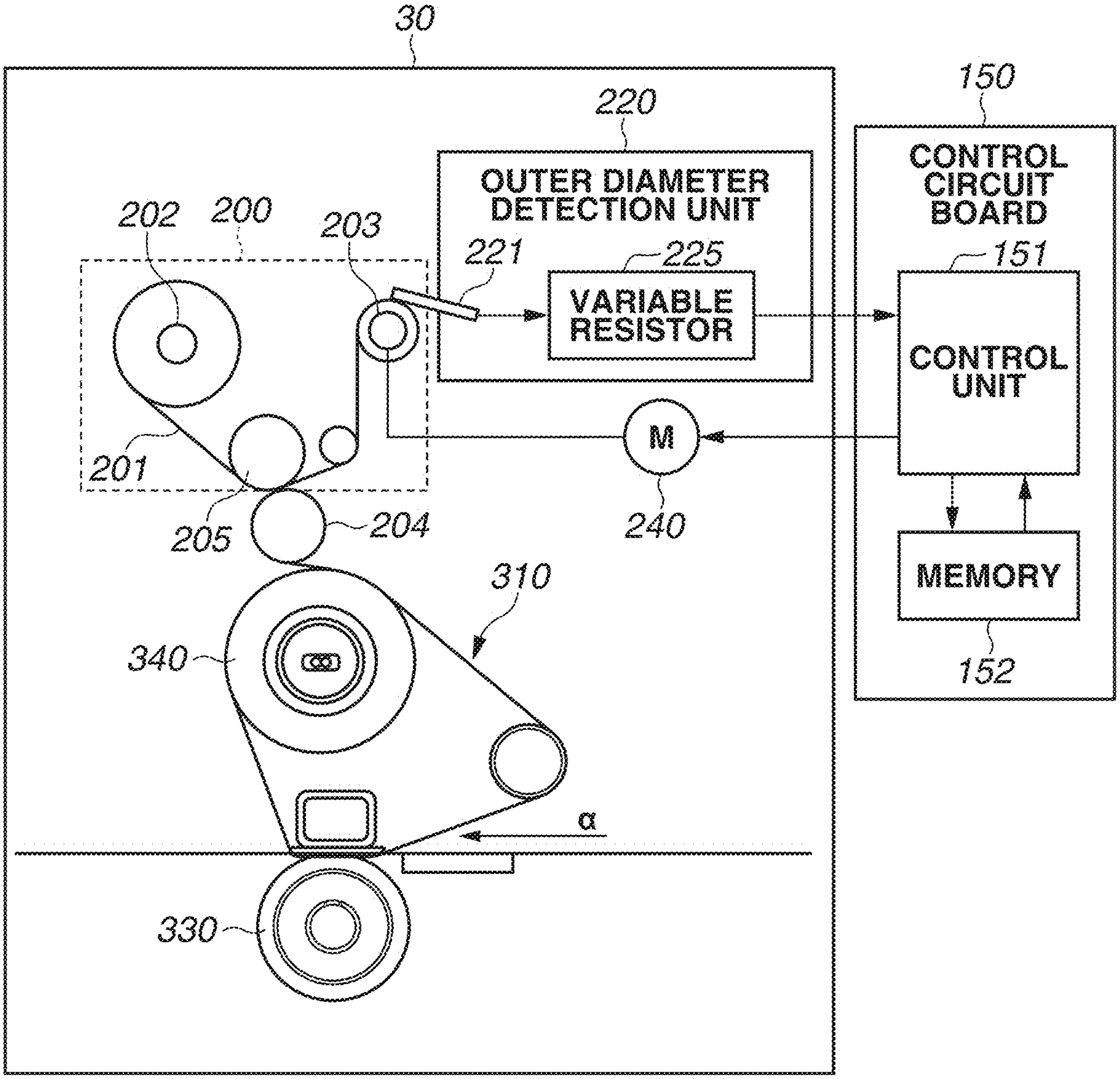
FIG. 3 is a schematic diagram illustrating the web unit.

Next, a web unit 200 and a collection roller 204 will be described with reference to FIGS. 2 and 3.

The fixing device 30 fixes the toner born on the recording material S to the recording material S using heat and pressure. If excessive heat is applied to the toner on the recording material S, the toner may adhere to the heating rotary member 300 without being fixed to the recording material S, due to the toner being excessively melted on the recording material S. This phenomenon is called hot offset. If the toner adhering to the heating rotary member 300 is not collected due to the hot offset, the hot offset toner adheres to the subsequent sheet and is fixed thereto since the heating rotary member 300 is rotated. As a result, there is a possibility that an area of the sheet on which the hot offset toner is fixed may cause an image defect.

To address the issue, the web unit 200 is used to collect the hot offset toner. The web unit 200 collects the toner adhering to the heating rotary member 300. Accordingly, the image defect due to the hot offset can be suppressed.

The web unit 200 includes a web 201, a supply roller 202, a winding roller 203, and a pressing roller 205.

The collection roller 204 is rotationally driven while being in contact with the surface of the fixing belt 310. The hot offset toner adheres to the surface of the fixing belt 310 in a state of being melted by the heat applied at the fixing nip portion N. The collection roller 204 according to the present exemplary embodiment has an outer diameter of 20 mm and is formed of stainless-steel (SUS) 303 that has higher compatibility with the melted toner than the surface of the release layer of the fixing belt 310. Thus, the melted toner is transferred to the surface of the collection roller 204.

The toner transferred to the surface of the collection roller 204 is collected from the collection roller 204 by the web 201 made of an unwoven fabric or the like. The web unit 200 includes the pressing roller 205 for pressing the web 201 against the collection roller 204. The web 201 forms a predetermined nip width while being pressed against the collection roller 204 by the pressing roller 205. The toner transferred to the collection roller 204 is collected by the web 201.

The web 201 used to collect the toner is wound by the winding roller 203. In the present exemplary embodiment, the winding roller 203 winds the web 201, for example, at a rate of 0.2 mm per four A4-size sheets. One end portion of the web 201 is wound by the winding roller 203, and the other end portion is wound around the supply roller 202. The unused web 201 is wound around the supply roller 202, and when the web 201 is wound by the winding roller 203, the unused web 201 is supplied from the supply roller 202. Accordingly, the unused web 201 is supplied to the contact portion with the collection roller 204 to collect the toner adhering to the surface of the fixing belt 310.

The web 201 is made of an unwoven fabric having a total length of 50 m. When the web 201 for collecting the toner runs out due to the fixing processing on the recording material S, the web 201 is to be replaced with a new one. In this case, the user that uses the image forming apparatus 100 calls a serviceman to have the web unit 200 replaced with a new one. In one embodiment, the life of the web unit 200 is prolonged because the number of times of calling a service man decreases as the life of the web unit 200 increases.

The reason why the web 201 collects the toner via the collection roller 204 will be described. The web 201 is made of an unwoven fabric or the like. Thus, if the web 201 is directly brought into contact with the fixing belt 310, not via the collection roller 204, deterioration of the surface of the fixing belt 310 can progress faster. If the deterioration of the surface of the fixing belt 310 progresses fast, the replacement frequency increases, which increases the time and effort of the user. Thus, the collection of toner via the collection roller 204 made of a metal enables the increase of the life of the fixing belt 310 because the web 201 does not directly make contact with the fixing belt 310. Unevenness of the surface of the fixing belt 310 is reflected in the gloss of the image formed on the recording material S. If the web 201 is directly brought into contact with the surface of the fixing belt 310, unevenness occurs on the surface of the fixing belt 310 and this may cause gloss unevenness on the image formed on the recording material S. Thus, the gloss unevenness can be suppressed by using the configuration in which the web 201 is not in direct contact with the surface of the fixing belt 310 and the toner is collected via the collection roller 204.

[Web Unit Contact Mechanism]

The web unit 200 has a mechanism (not illustrated) for enabling the web 201 to make contact with and separate from the collection roller 204. The collection roller 204 also has a mechanism (not illustrated) for making contact with and separating from the fixing belt 310. In a case where a print job is not received by the control unit 151, the collection roller 204 is separated from the fixing belt 310. In a case where a print job is received by the control unit 151, the collection roller 204 is brought into contact with the fixing belt 310 and a surface temperature of the collection roller 204 rises. Thus, when the toner on the surface of the fixing belt 310 comes into contact with the collection roller 204, the toner is easily kept in a dissolved state. This makes it easier to move the toner on the surface of the fixing belt 310 to the collection roller 204. The surface temperature of the collection roller 204 becomes sufficiently high, and the web 201 is brought into contact with the collection roller 204 one second before the recording material S is conveyed to the fixing nip portion N. The web 201 is kept in contact with the collection roller 204 and the collection roller 204 is kept in contact with the fixing belt 310 until the print job is completed.

In a case where the print job is completed, the web 201 is separated from the collection roller 204 after the last sheet of the recording material S in the print job has passed through the fixing nip portion N.

[Control of Winding Roller Rotation Amount Based on Outer Diameter of Wound Web]

The web 201 is wound in such a manner that the winding roller 203 is rotated to wind the used web 201. The amount of the web 201 wound by the winding roller 203 gradually increases as the used web 201 is wound, and the outer diameter of the web 201 wound by the winding roller 203 increases. If the rotation amount of the winding roller 203 is made constant, the winding amount of the web 201 increases as the outer diameter of the wound web 201 increases. To make the winding amount of the web 201 constant, the rotation amount of the winding roller 203 is to be controlled based on the outer diameter of the wound web 201. If the rotation amount of the winding roller 203 is made constant without considering the outer diameter of the wound web 201, the web 201 is used more than necessary because the winding amount gradually increases, which reduces the life of the web 201.

To address the issue, the rotation amount of the winding roller 203 has been conventionally controlled considering the outer diameter of the wound web 201. The control has been performed by a web unit using a solenoid.

<Conventional Web Unit Using Solenoid>

Conventionally, the rotation amount of the winding roller 203 has been controlled based on the outer diameter of the wound web 201 by using the solenoid. In a case where the rotation amount of the winding roller 203 is controlled using the solenoid, the winding amount is controlled by regulating an operation amount of the solenoid per time based on the outer diameter of the wound web 201.

Levers moved by the solenoid rotate the winding roller 203 via a gear to wind the web 201. In a case where a desired amount of the web 201 is wound using the solenoid, a large error occurs in the winding amount of the web 201 due to the configuration.

One of the reasons for the large error in the winding amount of the web 201 is contact between the levers. In a case where a desired amount of the web 201 is wound using the solenoid, many levers are to be used. More specifically, three levers including a lever [1] moving along with the outer diameter of the wound web 201, a lever [2] moving along with the operation of the solenoid, and a lever [3] regulating the moving amount of the lever [2] along with the movement of the lever [1], are to be used.

These levers are in contact with each other in the above-described configuration.

The contact positions of the levers gradually change with the change in the outer diameter of the wound web 201. The change in the contact positions of the levers is very small. It is thus difficult to consider the change in the contact positions of the levers. As a result, the error in the winding amount of the web 201 occurs. In other words, the error is to be reduced by using a configuration that reduces the contact between the levers.

In addition, because the web 201 made of an unwoven fabric or the like is thin, the outer diameter of the wound web 201 changes slightly. Thus, to wind a desired amount of the web 201 with a high accuracy, the outer diameter of the wound web 201 is to be detected accurately. Conventionally, a gear has been used to detect the outer diameter of the wound web 201. When a gear is used, the outer diameter of the web 201 can be accurately detected by finely cutting a notched portion of the gear. However, there was a limit for machining the notched portion of the gear. Therefore, the error in detecting the outer diameter of the wound web 201 increased.

In the conventional web unit, the web 201 is wound more by the amount corresponding to the occurring error so that the winding amount does not fall below the desired amount for the cleaning if the error occurs. Accordingly, the consumption of the web 201 is increased by the amount corresponding to the large error generated in the conventional web unit. Consequently, the life of the web 201 is reduced.

To address the issue, in the present exemplary embodiment, a configuration including a variable resistor 225 and a winding motor 240 is used to wind a desired amount of the web 201 with a high accuracy. Details of the configuration will be described below.

<Web Winding Control>

[Detection of Outer Diameter of Web]

Figure 4A:
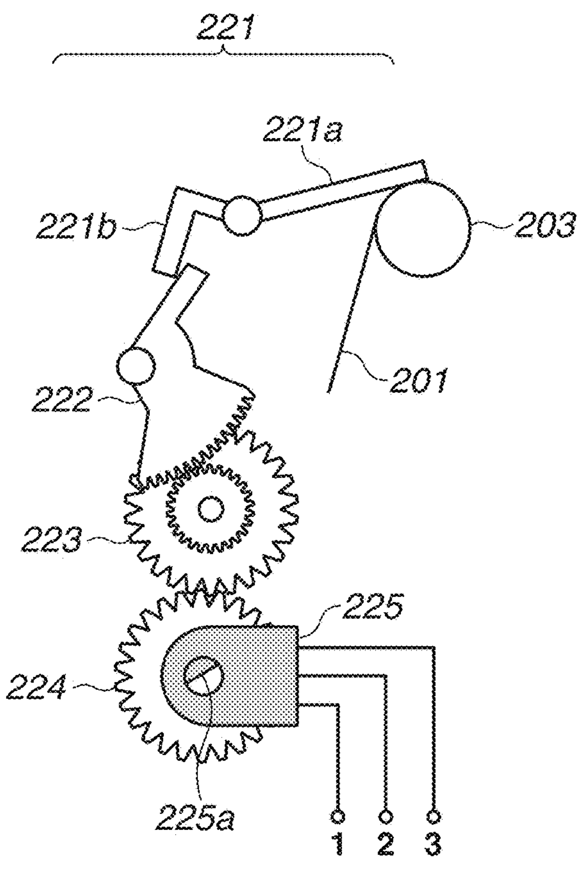
FIGS. 4A and 4B are schematic diagrams illustrating a configuration of an outer diameter detection unit.
Figure 4B:
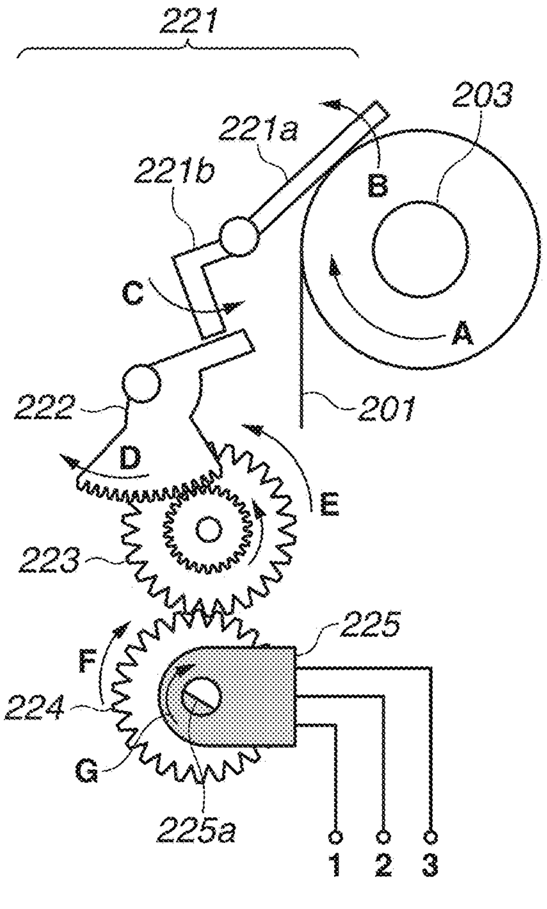

With reference to FIGS. 4A and 4B, a description will be given of a mechanism in which the variable resistor 225 converts the outer diameter of the wound web 201 into a resistance value via a contact member 221 (refer to FIG. 3) according to the present exemplary embodiment. The fixing device 30 includes an outer diameter detection unit 220 (refer to FIG. 3) for detecting the outer diameter of the wound web 201. FIGS. 4A and 4B schematically illustrate an example of a configuration of the outer diameter detection unit 220. FIG. 4A illustrates a state where the web unit 200 is new and has not been wound yet by the winding roller 203. FIG. 4B illustrates a state where the outer diameter of the web 201 wound by the winding roller 203 is large as a result of the web 201 being wound by the winding roller 203 in a direction indicated by an arrow A.

The contact member 221 of the outer diameter detection unit 220 illustrated in FIGS. 4A and 4B includes a contact portion 221*a* and a contact portion 221*b*. The contact portion 221*a* of the contact member 221 is urged and brought into contact with the outer surface of the wound web 201. The contact portion 221*b* of the contact member 221 is in contact with a ring gear 222. Depending on the outer diameter of the wound web 201, the contact portion 221*a* of the contact member 221 is rotated in a direction indicated by an arrow B in FIG. 4B. Then, the contact portion 221*b* of the contact member 221 is rotated in a direction indicated by an arrow C to rotate the ring gear 222 in a direction indicated by an arrow D. A gear portion of the ring gear 222 is engaged with a step gear 223. When the ring gear 222 is rotated in the direction indicated by the arrow D, the step gear 223 is rotated in a direction indicated by an arrow E. The step gear 223 is engaged with a gear portion 224 of the variable resistor 225. A gear shaft of the gear portion 224 of the variable resistor 225 is a D-cut shaft and is fit to a rotation portion 225*a* of the variable resistor 225. Accordingly, when the step gear 223 is rotated in the direction indicated by the arrow E, the gear portion 224 is rotated in a direction indicated by an arrow F and the rotation portion 225*a* of the variable resistor 225 is rotated in a direction indicated by an arrow G. More specifically, when the web 201 is wound by the winding roller 203 to increase the outer diameter of the wound web 201, the position of the contact member 221 is changed to cause the rotation portion 225*a* of the variable resistor 225 to rotate. Thus, when the web 201 is wound by the winding roller 203 and the outer diameter of the wound web 201 increases, a resistance value R12 of the variable resistor 225 increases. The resistance value R12 of the variable resistor 225 is configured to change based on the rotation amount of the rotation portion 225*a*.

[Calculation of Detection Voltage Vsns from Resistance Value of Variable Resistor]

A relationship between the rotation portion 225*a* of the variable resistor 225 and the resistance value R12 of the variable resistor 225 will be described with reference with FIG. 5.

Figure 5:
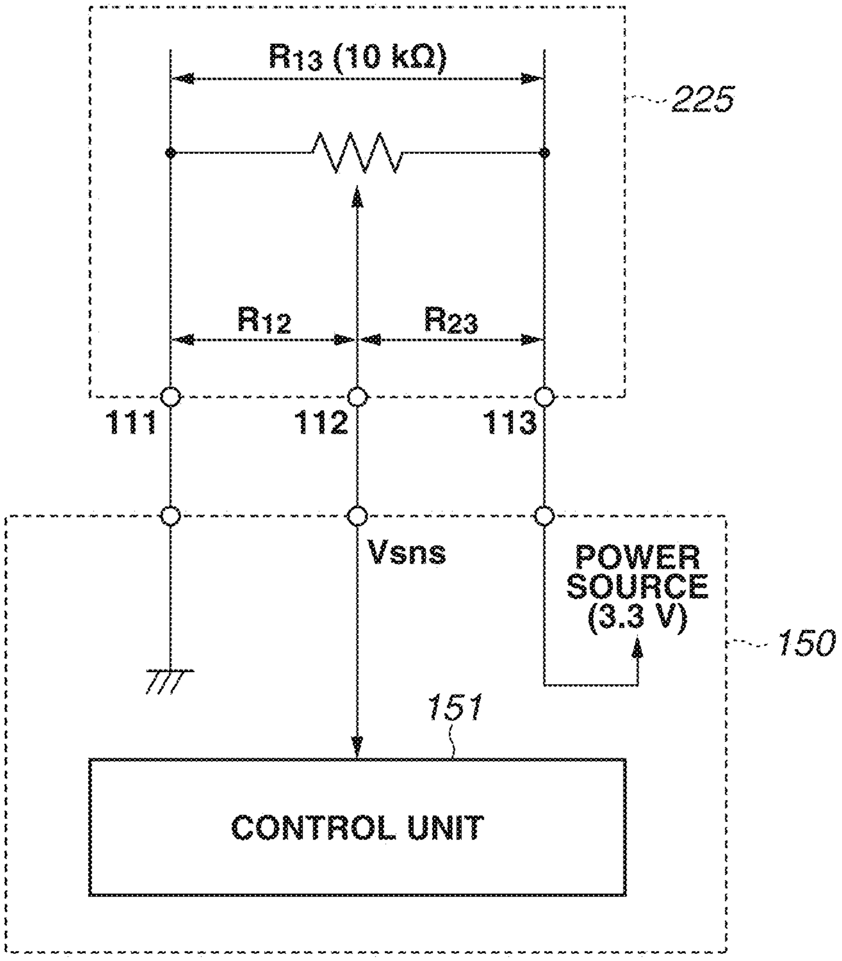
FIG. 5 is a circuit diagram illustrating a detection circuit of a variable resistor.

FIG. 5 is a circuit diagram illustrating a detection circuit of the variable resistor 225 according to the present exemplary embodiment. The variable resistor 225 includes a terminal 111, a terminal 112, and a terminal 113. The terminals 111 to 113 of the variable resistor 225 illustrated in FIG. 5 correspond to the terminals 111 to 113 of the variable resistor 225 illustrated in FIGS. 4A and 4B. The terminal 112 is connected to the rotation portion 225*a*. The resistance value R12 between the terminals 111 and 112 and a resistance value R23 between the terminals 112 and 113 are changed based on the angle (the rotation amount) of the rotation portion 225*a*.

The terminals 111 to 113 of the variable resistor 225 are connected to a control circuit board 150. The terminal 111 is connected to a ground (GND) terminal, the terminal 112 is connected to a terminal of the control unit 151 as a detection voltage Vsns, and the terminal 113 is connected to a power source (3.3 V).

In the present exemplary embodiment, assume that a total resistance value R13 of the variable resistor 225 between the terminals 111 and 113 is 10 MI, and the angle (the rotation amount) of the rotation portion 225*a* of the variable resistor 225, the resistance value R12 between the terminals 111 and 112, and the resistance value R23 between the terminals 112 and 113 are changed. In this case, the following formula (2) is satisfied.

$$R13=R12+R23=10\ \text{k}\Omega \quad (1)$$

In addition, since the terminal 113 having the total resistance value R13 of the variable resistor 225 is connected to the power source (3.3 V), the detection voltage Vsns is input to the control unit 151 connected to the terminal 112. The detection voltage Vsns is obtained by dividing the power source (3.3 V) based on the resistance values R12 and R23, and can be obtained using the following formula (2).

$$Vsns=3.3[\text{V}]\times(R12)\div(R12+R23) \quad (2)$$

As a result, the position of the contact member 221 can be obtained as an electrical signal by using the detection voltage Vsns.

When the web 201 is wound by the winding roller 203 and the outer diameter of the wound web 201 increases, the resistance value R12 of the variable resistor 225 increases. The detection voltage Vsns increases with the increase of the resistance value R12 of the variable resistor 225.

[Relationship between Detection Voltage and Outer Diameter of Web]

Figure 6:
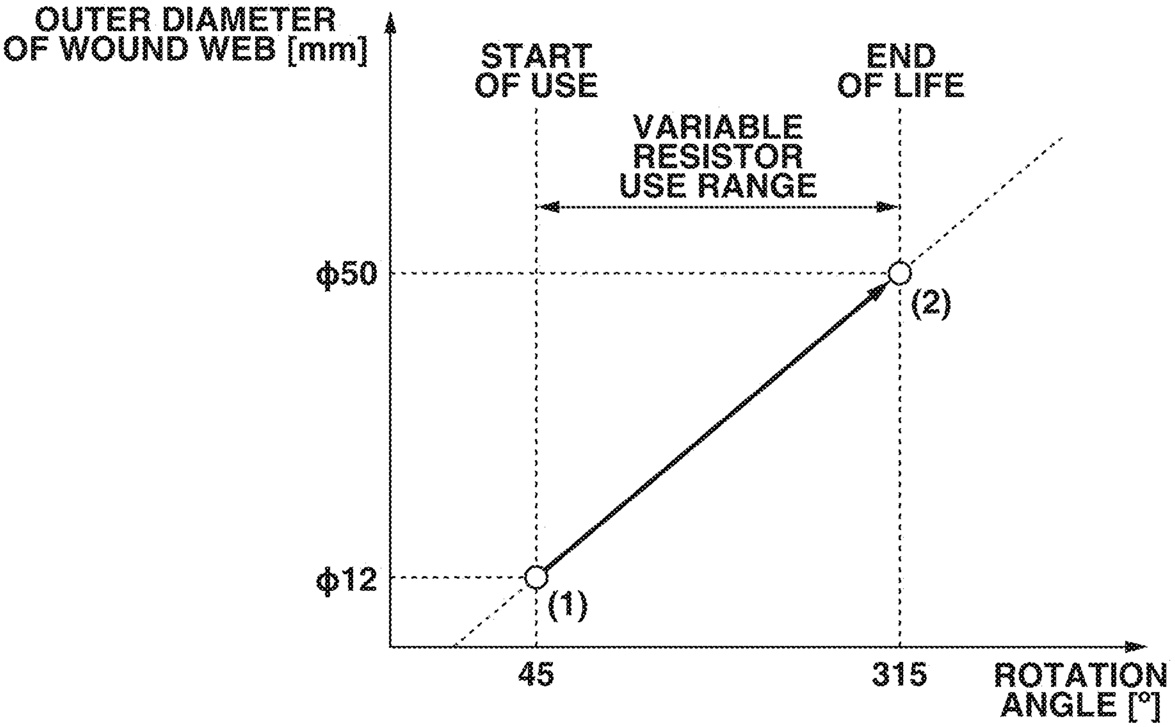
FIG. 6 is a graph illustrating a relationship between an outer diameter of a wound web and a rotation angle of the variable resistor.

A relationship between the outer diameter of the wound web 201 and the rotation angle of the variable resistor 225 will be described with reference to FIG. 6. In the present exemplary embodiment, assume that the outer diameter of the winding roller 203 is Φ12 mm and the outer diameter of the wound web 201 at the time when the web 201 to be wound by the winding roller 203 runs out (at the time of end-of-life of the web 201) is Φ50 mm. Also assume that the rotation angle of the variable resistor 225 is between 45 degrees and 315 degrees. More specifically, the angle of the variable resistor 225 is 45 degrees at the time of starting use of the web 201, and the rotation angle of the variable resistor 225 is 315 degrees at the time of end-of-life of the web 201.

Figure 7:
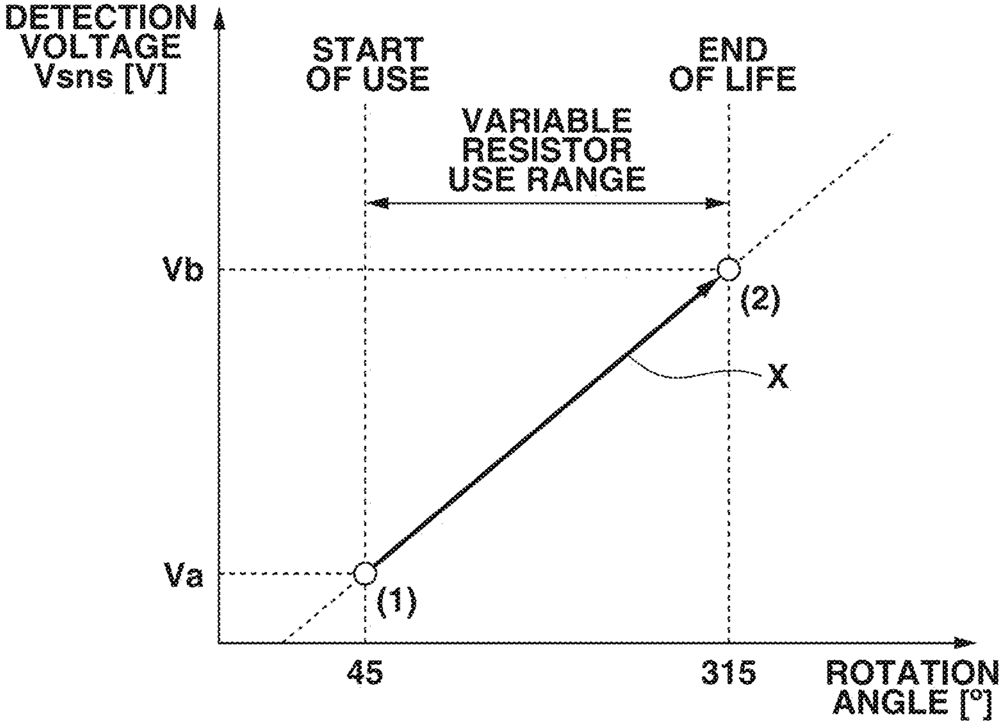
FIG. 7 is a graph illustrating a relationship between a detection voltage and the rotation angle of the variable resistor.

A relationship between the rotation angle of the variable resistor 225 and a voltage value to be output will be described with reference to FIG. 7. Assume that the time of starting use of the web unit 200 before shipment is a point (1) and the rotation portion 225*a* of the variable resistor 225 at the point (1) is at 45 degrees. The detection voltage Vsns at the point (1) is assumed to be a detection voltage value Va. Through the use of the web 201, the outer diameter of the wound web 201 increases and the resistance value R12 of the variable resistor 225 (between the terminals 111 and 112) also increases. Accordingly, the detection voltage Vsns increases and reaches a point (2) at the time of end-of-life of the web 201. Assume that the rotation angle of the rotation portion 225*a* of the variable resistor 225 at the point (2) is 315 degrees and the detection voltage Vsns at the point (2) is a detection voltage value Vb.

A memory 152 (see FIG. 3) stores information data of the web 201. The information data includes the detection voltage value Va, which is a detection voltage value before shipment, and the detection voltage value Vb, which is a detection voltage value at the time of end-of-life of the web 201.

[Winding of Web Using Winding Motor]

The control unit 151 is electrically connected to the terminals 111 to 113 of the variable resistor 225, and can obtain the resistance value R12 of the variable resistor 225. Thus, the control unit 151 can obtain the detection voltage Vsns using the formula (2). The control unit 151 is also connected to the winding motor 240. In the present exemplary embodiment, the winding motor 240 is a motor for rotating the winding roller 203. The control unit 151 controls the rotation amount of the winding motor 240 based on the obtained detection voltage Vsns. More specifically, in the present exemplary embodiment, in a case where the winding roller 203 can wind the web 201 by 0.2 mm in one rotation operation of the winding roller 203, the toner on the surface of the fixing belt 310 can be collected and the possibility of an image defect on the subsequent sheet can be suppressed. For this reason, a desired amount of the web 201 to be wound in one rotation operation of the winding roller 203 is 0.2 mm. The rotation amount of the winding motor 240 is decreased as the outer diameter of the wound web 201 increases so that the amount of the web 201 to be wound by the winding roller 203 is 0.2 mm. At this time, the control unit 151 rotates the winding motor 240 by controlling the rotation amount of the winding motor 240 based on the value of the obtained detection voltage Vsns.

In the present exemplary embodiment, a stepping motor is used as the winding motor 240. The control unit 151 controls the rotation amount of the stepping motor by controlling the number of pulses input to the stepping motor, thereby controlling the amount of the web 201 to be wound.

Furthermore, the amount of the unused web 201 gradually decreases as the winding motor 240 winds the web 201, and a replacement timing of the web 201 approaches. The memory 152 stores the detection voltage value Vb that is a voltage value at the time of end-of-life of the web 201. Thus, the control unit 151 can determine whether the detection voltage Vsns has reached the detection voltage value Vb. This makes it possible to determine the replacement timing of the web 201.

In a case where the web 201 is replaced with a new one, the amount of the web 201 wound by the winding roller 203 is reset. Thus, the outer diameter of the wound web 201 corresponding to the amount of the web 201 wound by the winding roller 203 is also reset. Since the contact member 221 is urged toward the outer surface of the wound web 201, the detection voltage Vsns is returned to the detection voltage value Va, which is the value at the time of starting use of the web 201.

In the present exemplary embodiment, the levers are not in contact with each other in a period after the resistance value R12 of the variable resistor 225 is converted into the detection voltage Vsns and before the winding roller 203 is rotated. With this configuration, the above-described error caused by the contact between the levers can be reduced compared with the conventional configuration. In this way, the error in the winding amount of the web 201 can be reduced to suppress the consumption of the web 201. As a result, the life of the web 201 can be prolonged.

[Effect of Detecting Outer Diameter of Web Using Variable Resistor]

The outer diameter of the wound web 201 increases little by little because the web 201 is thin. Thus, in the present exemplary embodiment, the variable resistor 225 is used in the web unit 200 to obtain the detection voltage Vsns. Since the detection voltage Vsns is an electrical signal, the detection voltage Vsns can be changed corresponding to a small change in the outer diameter of the wound web 201. Thus, the control unit 151 can control the rotation amount of the winding motor 240 finely.

As a specific example, in a case where the resistance value R12 of the variable resistor 225 is small, the wound web 201 is small in amount and also in diameter. Accordingly, the rotation amount of the winding roller 203 is controlled to be large. On the other hand, in a case where the resistance value R12 of the variable resistor 225 is large, the wound web 201 is large in amount and also in outer diameter. Accordingly, the rotation amount of the winding roller 203 is controlled to be small. At this time, the rotation amount of the winding roller 203 can be set finely based on the position of the contact member 221. Thus, the web 201 can be wound accurately. As a result, the life of the web 201 can be prolonged.

While the variable resistor 225 of a rotation type (in which a sliding member rotates) is used in the present exemplary embodiment, different types of the variable resistor 225 may be used. For example, the variable resistor 225 including the rotation portion 225*a* of a slide type may be used.

In the present exemplary embodiment, a rotary volume which is the variable resister 225 of a rotation type is used. This is because it can be arranged in a space saving manner as compared with the slide type.

[Effect of Using Variable Resistor and Winding Motor]

The position of the contact member 221 is converted into the resistance value R12 by the variable resistor 225. The detection voltage Vsns is obtained from the resistance value R12, and the winding motor 240 controls the winding roller 203 based on the detection voltage Vsns. As a result, the web 201 can be wound accurately, so that the life of the web 201 can be prolonged.

[Effect of Control Unit Controlling Winding Motor Using Detection Voltage Vsns]

The control unit 151 controls the rotation amount of the winding motor 240. At this time, the control unit 151 uses the detection voltage Vsns, not the resistance value R12 obtained from the variable resistor 225. The variable resistor 225 is made of metal. Generally, the electric resistivity of the metal tends to increase as the temperature rises. For this reason, the resistance value R12 obtained from the variable resistor 225 changes depending on the temperature of an external environment. For example, in a case where the control unit 151 controls the rotation amount of the winding motor 240 using the resistance value R12, the rotation amount of the winding motor 240 changes depending on the temperature of the external environment. As a result, the error in the winding amount of the wound web 201 increases. On the other hand, it can be said that the detection voltage Vsns obtained using the formula (2) is less dependent on the temperature of the external environment than the resistance value R12. For this reason, the control unit 151 controls the winding motor 240 using the detection voltage Vsns. Accordingly, the web 201 can be wound accurately.

Next, a modification example of the present exemplary embodiment will be described with reference to FIGS. 8 and 9. Descriptions of the same components as those described above will be omitted.

Figure 8:
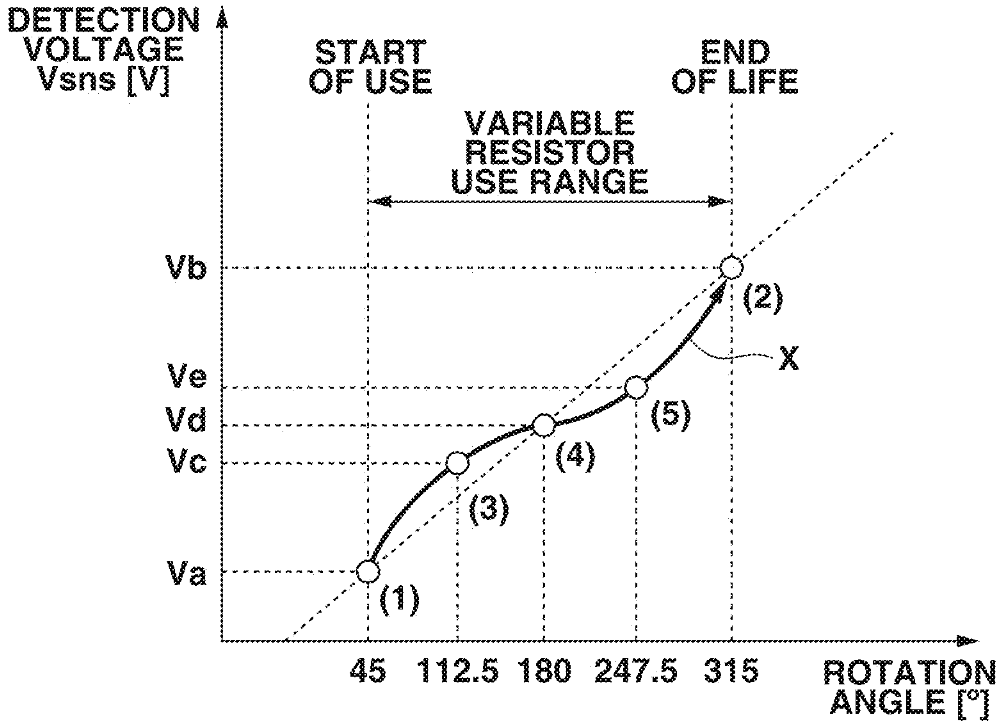
FIG. 8 is a graph illustrating a relationship between the detection voltage and the rotation angle of the variable resistor according to a modification example.
Figure 9:
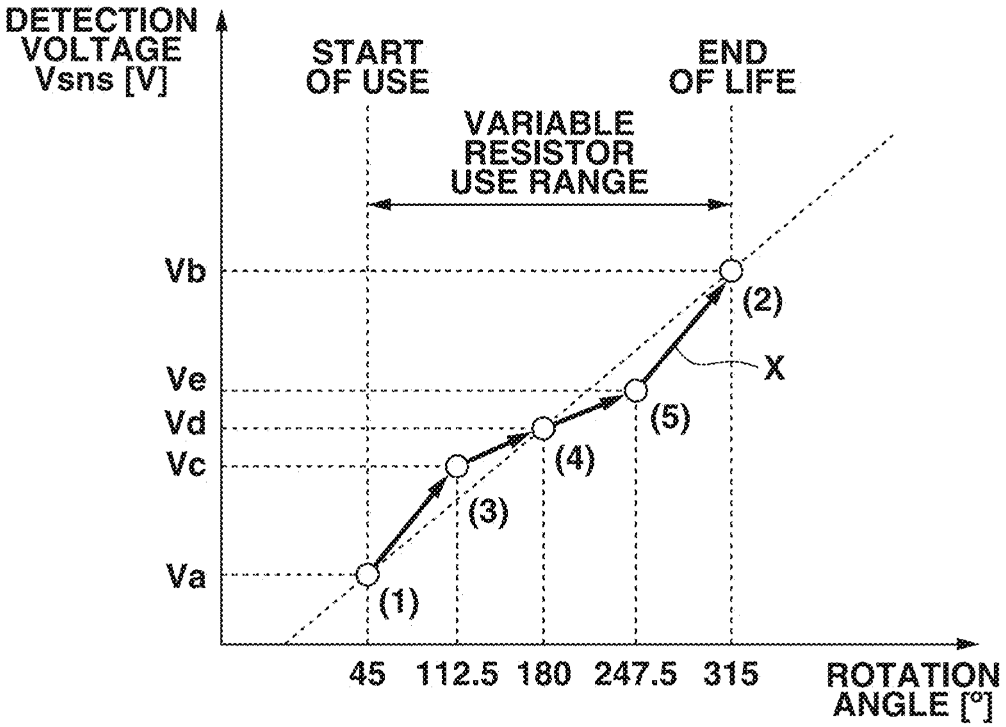
FIG. 9 is a graph obtained by applying a linear correction to the relationship illustrated in FIG. 8.

FIG. 8 is a graph illustrating a relationship X between the detection voltage Vsns and the rotation angle of the variable resistor 225 according to the present modification example. FIG. 9 is a graph illustrating the relationship X between the rotation angle of the variable resistor 225 and the detection voltage Vsns according to the present modification example.

FIG. 8 illustrates a state in which the relationship X obtained based on the rotation angle of the variable resistor 225 and the detection voltage Vsns is not linear. FIG. 9 illustrates a state in which the relationship X obtained based on the rotation angle of the variable resistor 225 and the detection voltage Vsns is linearly corrected.

As illustrated in FIG. 8, the relationship X between the rotation angle of the variable resistor 225 and the detection voltage Vsns is sometimes non-linear. Before shipment, the memory 152 stores information data about detection voltage values at five points in total, i.e., the detection voltage value Va of the variable resistor 225 at the time of starting use of the web unit 200, the detection voltage value Vb at the time of end-of-life of the web unit 200, and detection voltage values Vc, Vd, and Ve at three points therebetween. The control unit 151 reads and writes the information data from and to the memory 152. The control unit 151 linearly corrects the relationship X based on the obtained information about the detection voltage values at five points, as illustrated in FIG. 9. Furthermore, the control unit 151 controls the driving amount of the winding motor 240 based on the linearly corrected relationship X, so that the web 201 is wound accurately by the winding motor 240.

In a case where the relationship X between the rotation angle of the variable resistor 225 and the detection voltage Vsns is not linear, the difference between the values of the detection voltage Vsns is small in an area where the inclination of the relationship X is small. For this reason, even a slight detection error may cause an erroneous detection of the outer diameter of the winding roller 203 to lower the driving amount accuracy of the winding motor 240. On the other hand, the detection error can be reduced by linearly correcting the relationship X.

According to the above-described present exemplary embodiment, even if the relationship X obtained based on the rotation amount of the variable resistor 225 and the detection voltage Vsns is not linear, the web 201 can be wound accurately. As a result, the life of the web 201 can be prolonged.

While in the present exemplary embodiment, the linear correction is performed using the information about the detection voltage values at five points in total, i.e., the detection voltage value Va at the start of use (when the web has not received any toner), the detection voltage value Vb at the end of life (when the web is considered to be fully wound), and the detection voltage values Vc, Vd, and Ve at three points therebetween, the number of detection voltage values can be optionally selected and the linear correction may be performed based on information about detection voltage values at more points.

While in the present exemplary embodiment, voltage detection is performed by equally dividing the rotation amount of the variable resistor 225 to determine intervals between the detection voltage values Va and Vd. However, the intervals may be determined optionally.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141377, filed Aug. 31, 2021, which is hereby incorporated by reference herein in its entirety.

What is claimed is:

1. An image forming apparatus comprising:

a heating rotary member configured to heat toner born on a recording material;

a pressure rotary member configured to pressurize the heating rotary member, wherein the heating rotary member and the pressure rotary member form a fixing nip portion and fix a toner image to the recording material at the fixing nip portion while nipping and conveying the recording material with the toner born on the recording material;

a web configured to collect toner adhering to a surface of the heating rotary member without being fixed to the recording material;

a winding roller configured to wind the web;

a motor configured to rotate the winding roller to wind the web;

a contact member configured to make contact with an outer surface of the web wound by the winding roller and to move based on a position of the outer surface;

a variable resistor configured to be connected so as to change a resistance value of the variable resistor depending on a position of the contact member; and a control unit configured to control a rotation amount of the motor based on the resistance value, wherein the contact member includes a lever where the lever is configured to make contact with the outer surface of the web and to swing based on an outer diameter of the winding roller.

2. The image forming apparatus according to claim 1, further comprising a collection roller configured to collect, from the heating rotary member, the toner adhering to the heating rotary member without being fixed to the recording material, wherein the web collectsis configured to collect the toner adhering to the collection roller from the collection roller.

3. The image forming apparatus according to claim 1, wherein the control unit is configured to rotate the winding roller every predetermined number of sheets of the recording material, and to reduce a rotation amount of the winding roller as the outer diameter of the web wound by the winding roller increases.

4. The image forming apparatus according to claim 1, wherein the control unit is configured to obtain a voltage from the resistance value of the variable resistor and to control the rotation amount of the motor based on the obtained voltage.

5. The image forming apparatus according to claim 4, wherein the motor is a stepping motor.

6. The image forming apparatus according to claim 1, wherein the heating rotary member includes a fixing belt that is rotatable and endless, and further includes a heating roller configured to make contact with an inner circumferential surface of the fixing belt to apply heat to the fixing belt.

7. The image forming apparatus according to claim 1, wherein the variable resistor is a rotary volume, and wherein the first lever is configured to swing based on an outer diameter of the web wound by the winding roller, the contact member further includes a gear mechanism arranged to rotate a rotation portion of the variable resistor, the rotation portion is arranged so as to rotate when the first lever is swung, and a rotation angle of the rotation portion corresponds to a rotation angle of the variable resistor.

8. An image forming apparatus comprising:

a heating rotary member configured to heat toner born on a recording material;

a pressure rotary member configured to pressurize the heating rotary member, wherein the heating rotary member and the pressure rotary member form a fixing nip portion and fix a toner image to the recording material at the fixing nip portion while nipping and conveying the recording material with the toner born on the recording material;

a web configured to collect toner adhering to a surface of the heating rotary member without being fixed to the recording material;

a winding roller configured to wind the web;

a motor configured to rotate the winding roller to wind the web;

a contact member configured to make contact with an outer surface of the web wound by the winding roller and to move based on a position of the outer surface;

a variable resistor configured to be connected so as to change a resistance value of the variable resistor depending on a position of the contact member; and a control unit configured to control a rotation amount of the motor based on the resistance value, wherein the contact member includes a first lever where the first lever is configured to make contact with the outer surface of the web and to swing based on an outer diameter of the web wound by the winding roller, and wherein the contact member further includes a gear mechanism arranged to rotate a rotation portion of the variable resistor, the rotation portion is arranged so as to rotate when the first lever is swung, and a rotation angle of the rotation portion corresponds to a rotation angle of the variable resistor.

9. The image forming apparatus according to claim 8, further comprising a collection roller configured to collect, from the heating rotary member, the toner adhering to the heating rotary member without being fixed to the recording material, wherein the web is configured to collect the toner adhering to the collection roller from the collection roller.

10. The image forming apparatus according to claim 8, wherein the control unit is configured to rotate the winding roller every predetermined number of sheets of the recording material, and to reduce a rotation amount of the winding roller as the outer diameter of the web wound by the winding roller increases.

11. The image forming apparatus according to claim 8, wherein the control unit is configured to obtain a voltage from the resistance value of the variable resistor and to control the rotation amount of the motor based on the obtained voltage.

12. The image forming apparatus according to claim 11, wherein the motor is a stepping motor.

13. The image forming apparatus according to claim 8, wherein the heating rotary member includes a fixing belt that is rotatable and endless, and further includes a heating roller configured to make contact with an inner circumferential surface of the fixing belt to apply heat to the fixing belt.

14. The image forming apparatus according to claim 8, wherein the variable resistor is a rotary volume.

* * * * *